US012158989B2

(12) United States Patent
Guillotel et al.

(10) Patent No.: US 12,158,989 B2
(45) Date of Patent: Dec. 3, 2024

(54) HAPTIC SCENE REPRESENTATION FORMAT

(71) Applicant: InterDigital CE Patent Holdings, SAS, Paris (FR)

(72) Inventors: Philippe Guillotel, Vern sur Seiche (FR); Fabien Danieau, Rennes (FR); Quentin Galvane, Thorigné-fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/026,189

(22) PCT Filed: Sep. 6, 2021

(86) PCT No.: PCT/EP2021/074515
§ 371 (c)(1),
(2) Date: Mar. 14, 2023

(87) PCT Pub. No.: WO2022/053439
PCT Pub. Date: Mar. 17, 2022

(65) Prior Publication Data
US 2023/0367395 A1 Nov. 16, 2023

(30) Foreign Application Priority Data
Sep. 14, 2020 (EP) .................................... 20306028

(51) Int. Cl.
*G06F 3/01* (2006.01)
*G06F 3/048* (2013.01)

(52) U.S. Cl.
CPC .............. *G06F 3/016* (2013.01); *G06F 3/011* (2013.01); *G06F 3/048* (2013.01)

(58) Field of Classification Search
CPC ........... G06F 3/016; G06F 3/011; G06F 3/048
See application file for complete search history.

(56) References Cited

U.S. PATENT DOCUMENTS 5,689,669 A * 11/1997 Lynch ................... G06F 3/0481
715/848
6,002,853 A * 12/1999 de Hond ............... G06F 16/954
709/219

(Continued)

FOREIGN PATENT DOCUMENTS

EP 3506262 A1 7/2019
WO WO 2016102391 A1 6/2016

(Continued)

OTHER PUBLICATIONS

Anonymous, "The MPEG-V System Architecture", MPEG Document Management System (MDMS), Retrieved from the Internet on Mar. 3, 2023, URL: http://wg11.sc29.org/mpeg-v, 1 page.

(Continued)

*Primary Examiner* — Nicholas Augustine
(74) *Attorney, Agent, or Firm* — Condo Roccia Koptiw LLP

(57) ABSTRACT

A haptic rendering device and corresponding method allows to render a haptic effect described by metadata comprising, for at least one haptic channel, information representative of a geometric model, and information representative of an element of the geometric model where to apply the haptic feedback, and wherein an associated haptic file comprises the haptic signal to be applied. A file format for carrying the required information is provided.

19 Claims, 9 Drawing Sheets

(56) References Cited

U.S. PATENT DOCUMENTS

| | | | | |
|---|---|---|---|---|
| 6,079,982 A * | 6/2000 | Meader | A63F 13/54 | 434/30 |
| 6,119,147 A * | 9/2000 | Toomey | G06Q 10/109 | 719/329 |
| 6,179,619 B1 * | 1/2001 | Tanaka | A63G 7/00 | 472/60 |
| 6,219,045 B1 * | 4/2001 | Leahy | H04L 67/10 | 709/204 |
| 6,243,091 B1 * | 6/2001 | Berstis | G06F 3/04815 | 715/205 |
| 6,271,843 B1 * | 8/2001 | Lection | G06T 15/00 | 715/848 |
| 6,362,817 B1 * | 3/2002 | Powers | G06T 17/00 | 345/428 |
| 6,396,522 B1 * | 5/2002 | Vu | G06F 3/04845 | 715/848 |
| 6,414,679 B1 * | 7/2002 | Miodonski | G06T 13/00 | 707/999.005 |
| 6,570,563 B1 * | 5/2003 | Honda | A63F 13/352 | 345/473 |
| 6,573,903 B2 * | 6/2003 | Gantt | G06F 30/00 | 345/619 |
| 6,590,593 B1 * | 7/2003 | Robertson | G06F 3/04815 | 715/848 |
| 6,621,508 B1 * | 9/2003 | Shiraishi | G06F 3/0481 | 715/764 |
| 6,690,393 B2 * | 2/2004 | Heron | G06T 19/00 | 715/848 |
| 6,784,901 B1 * | 8/2004 | Harvey | H04L 67/02 | 715/848 |
| 6,961,055 B2 * | 11/2005 | Doak | A63F 13/63 | 345/677 |
| 7,382,288 B1 * | 6/2008 | Wilson | G08G 5/0021 | 340/972 |
| 7,414,629 B2 * | 8/2008 | Santodomingo | G06T 17/05 | 345/582 |
| 7,467,356 B2 * | 12/2008 | Gettman | G06Q 30/02 | 715/850 |
| 7,653,877 B2 * | 1/2010 | Matsuda | G06F 16/957 | 463/32 |
| 7,663,625 B2 * | 2/2010 | Chartier | G06T 19/20 | 700/182 |
| 7,746,343 B1 * | 6/2010 | Charaniya | G06N 7/01 | 345/428 |
| 7,788,323 B2 * | 8/2010 | Greenstein | G06Q 10/10 | 715/744 |
| 7,804,507 B2 * | 9/2010 | Yang | H04N 13/344 | 345/633 |
| 7,814,429 B2 * | 10/2010 | Buffet | G06F 30/00 | 715/763 |
| 7,817,150 B2 * | 10/2010 | Reichard | G06T 15/20 | 715/705 |
| 7,844,724 B2 * | 11/2010 | Van Wie | H04L 67/131 | 709/227 |
| 9,911,233 B2 * | 3/2018 | O'Connor | G06T 13/80 | |
| 11,217,076 B1 * | 1/2022 | Siminoff | H04N 7/181 | |
| 2001/0018667 A1 * | 8/2001 | Kim | G06Q 30/0277 | 705/14.73 |
| 2002/0095463 A1 * | 7/2002 | Matsuda | G06F 16/957 | 709/204 |
| 2002/0113820 A1 * | 8/2002 | Robinson | G06F 16/954 | 715/764 |
| 2004/0113887 A1 * | 6/2004 | Pair | G09B 25/08 | 345/156 |
| 2004/0193441 A1 * | 9/2004 | Altieri | A63F 13/216 | 709/203 |
| 2005/0093719 A1 * | 5/2005 | Okamoto | G01C 21/3697 | 705/14.62 |
| 2005/0128212 A1 * | 6/2005 | Edecker | G06T 17/05 | 345/581 |
| 2008/0030429 A1 * | 2/2008 | Hailpern | G06T 7/73 | 345/8 |
| 2008/0125218 A1 * | 5/2008 | Collins | G06Q 90/00 | 463/31 |
| 2008/0235570 A1 * | 9/2008 | Sawada | G06Q 10/10 | 356/3 |
| 2008/0246693 A1 * | 10/2008 | Hailpern | G06T 7/246 | 345/8 |
| 2009/0076791 A1 * | 3/2009 | Rhoades | A63F 13/53 | 703/21 |
| 2009/0091583 A1 * | 4/2009 | McCoy | G06T 19/006 | 345/419 |
| 2011/0063208 A1 | 3/2011 | Van et al. | | |
| 2013/0265502 A1 * | 10/2013 | Huebner | G06T 15/20 | 348/789 |
| 2016/0026253 A1 * | 1/2016 | Bradski | H04N 13/128 | 345/8 |
| 2018/0249151 A1 * | 8/2018 | Freeman | A61B 5/1123 | |
| 2018/0314887 A1 * | 11/2018 | Marshall | G06V 20/20 | |
| 2019/0236844 A1 * | 8/2019 | Balasian | G06F 3/0304 | |
| 2020/0218354 A1 * | 7/2020 | Beattie | G06T 7/41 | |
| 2020/0368616 A1 * | 11/2020 | Delamont | H04N 13/239 | |
| 2020/0374645 A1 * | 11/2020 | Settel | G06F 3/167 | |
| 2023/0191077 A1 * | 6/2023 | Dehkordi | G06T 19/006 | 600/27 |

FOREIGN PATENT DOCUMENTS

| | | | | |
|---|---|---|---|---|
| WO | WO 2018224847 A2 | 12/2018 | | |
| WO | WO-2022053439 A1 * | 3/2022 | | G06F 3/011 |
| WO | WO-2023046899 A1 * | 3/2023 | | G06F 3/016 |

OTHER PUBLICATIONS

Anonymous, "Information Technology—JPEG 2000 image coding system—Part 12: ISO base media file format", International Standard for ISO/IEC, Document: 15444-12, 5th edition, Feb. 20, 2015, 256 pages.

Anonymous, Haptic Codecs for the Tactile Internet, Institute of Electrical and Electronics Engineers (IEEE), IEEE Standards Association; Working Group Site & Liaison Index, Haptic Codec Task Group P1918 1.1, Retrieved from the Internet on Feb. 28, 2023, URL: https://grouper.ieee.org/groups/1918/1/haptic_codecs/index.html, 1 page.

Anonymous, Representing Haptic Patterns in AHAP Files: Understanding the Apple Haptic and Audio Pattern (AHAP) file format, Apple Developer Documentation, Retrieved from the Internet on Feb. 28, 2023, URL: https://developer.apple.com/documentation/corehaptics/representing_haptic_patterns_in_ahap_files, 8 pages.

Anonymous, "Information technology—JPEG 2000 image coding system—Part 12:ISO base media file format", International Standard, Document: 14496-12, Fifth edition, Feb. 20, 2015, 256 pages.

Anonymous, "A Standard for Haptics-Enabled Media Files", Electronic Design.com, Jul. 29, 2020 (Retrieved from the Internet on Feb. 28, 2023, URL: https://www.electronicdesign.com/technologies/analog/article/21136731/a-standard-forhapticsenabled-media-files), 9 pages.

Anonymous, "The Waveform Audio File Format", Wikipedia, The Free Encyclopedia, Retrieved form the Internet on Feb. 28, 2023, URL: https://fr.wikipedia.org/wiki/Waveform_Audio_File_Format, 7 pages.

* cited by examiner

| Syntax | No. of Bytes | Data Format |
| --- | --- | --- |
| scene_description_header() { | | |
|   format_id_string | 4 | Char |
|   format_version | 2 | Unsigned Int |
|   number_of_haptic_objects | 2 | Unsigned Int |
|   number_of_avatars_models | 2 | Unsigned Int |
|   description_string | 32 | Char |
|   for (i=0; i< number_of_avatars_models; i++) { | | |
|     avatar_description() | | |
|   } | | |
|   for (i=0; i<number_of_haptic_objects; i++) { | | |
|     haptic_object_file_name | 64 | Char |
|     number_of_haptic_channels | 2 | Unsigned Int |
|     for (i=0; i<number_of_haptic_channel; i++) { | | |
|       avatar_ID | 2 | Unsigned Int |
|       body_part_mask | 8 | Unsigned Int |
|       number_of_vertices | 2 | Unsigned Int |
|       for (i=0; i<number_of_vertices; i++) { | | |
|         vertex_ID | 4 | Unsigned Int |
|         coefficient | 4 | Float |
|     } | | |
| } | | |

Figure 4

| Syntax | No. of Bytes | Data Format |
|---|---|---|
| avatar_description () { | | |
|   format_version | 2 | Unsigned Int |
|   avatar_ID | 2 | Unsigned Int |
|   lod | 2 | Unsigned Int |
|   type | 32 | Char |
|   number_of_vertices | 2 | Unsigned Int |
|   number_of_faces | 2 | Unsigned Int |
|   for (i=0; i<number_of_vertices; i++) { | | |
|     vertex_ID | 2 | Unsigned Int |
|     vertex_x | 4 | Float |
|     vertex_y | 4 | Float |
|     vertex_z | 4 | Float |
|   } | | |
|   for (i=0; i<number_of_faces; i++) { | | |
|     face_ID | | |
|     vertex_ID_1 | 2 | Unsigned Int |
|     vertex_ID_2 | 2 | Unsigned Int |
|     vertex_ID_3 | 2 | Unsigned Int |
|     body_part_ID | 4 | Unsigned Int |
|   } | | |
| } | | |

Figure 6

| Syntax | No. of Bytes | Data Format |
|---|---|---|
| wav_format() { | | |
|   file_type_bloc_ID | 4 | Char |
|   file_size | 4 | Unsigned Int |
|   file_format_ID | 4 | Char |
| | | |
|   format_bloc_ID | 4 | Char |
|   bloc_size | 4 | Unsigned Int |
|   audio_format | 2 | Unsigned Int |
|   number_channels | 2 | Unsigned Int |
|   frequency | 4 | Unsigned Int |
|   bytes_per_seconds | 4 | Unsigned Int |
|   bytes_per_bloc | 2 | Unsigned Int |
|   bits_per_samples | 2 | Unsigned Int |
| | | |
|   data_bloc_id | 4 | Unsigned Int |
|   data_size | 4 | Unsigned Int |
|   for (i=0; i< number_channels; i++) {     for (j=0; j< data_size/number_channels; j++){       data_bytes     }   } } | bits_per_samples/8 | Float |

Figure 7

| body_part_ID | Name | body_part_mask | Hex |
|---|---|---|---|
| 1 | Head | 000000000000000000000001 | 0x000001 |
| 2 | Upper Chest | 000000000000000000000010 | 0x000002 |
| 3 | Chest | 000000000000000000000100 | 0x000004 |
| 4 | Pelvis | 000000000000000000001000 | 0x000008 |
| 5 | Right Upperarm | 000000000000000000010000 | 0x000010 |
| 6 | Left Upperarm | 000000000000000000100000 | 0x000020 |
| 7 | Right Forearm | 000000000000000001000000 | 0x000040 |
| 8 | Left Forearm | 000000000000000010000000 | 0x000080 |
| 9 | Right Hand Palm | 000000000000000100000000 | 0x000100 |
| 10 | Left Hand Palm | 000000000000001000000000 | 0x000200 |
| 11 | Right Hand Dorsum | 000000000000010000000000 | 0x000400 |
| 12 | Left Hand Dorsum | 000000000000100000000000 | 0x000800 |
| 13 | Right Hand Fingers | 000000000001000000000000 | 0x001000 |
| 14 | Left Hand Fingers | 000000000010000000000000 | 0x002000 |
| 15 | Right Thigh | 000000000100000000000000 | 0x004000 |
| 16 | Left Thigh | 000000001000000000000000 | 0x008000 |
| 17 | Right Calf | 000000010000000000000000 | 0x010000 |
| 18 | Left Calf | 000000100000000000000000 | 0x020000 |
| 19 | Right Foot Palm | 000001000000000000000000 | 0x040000 |
| 20 | Left Foot Palm | 000010000000000000000000 | 0x080000 |
| 21 | Right Foot Dorsum | 000100000000000000000000 | 0x100000 |
| 22 | Left Foot Dorsum | 001000000000000000000000 | 0x200000 |
| 23 | Right Foot Fingers | 010000000000000000000000 | 0x400000 |
| 24 | Left Foot Fingers | 100000000000000000000000 | 0x800000 |

Figure 8

| Body Part | body_part_mask | Hex |
|---|---|---|
| Right Arm | 000000000001010101010000 | 0x001550 |
| Left Arm | 000000000010101010100000 | 0x002AA0 |
| Right Leg | 010101010100000000000000 | 0x554000 |
| Left Leg | 101010101000000000000000 | 0xAA8000 |
| Upper Body | 000000000011111111111111 | 0x003FFF |
| Lower Body | 111111111100000000000000 | 0xFFC000 |
| Full Body | 111111111111111111111111 | 0xFFFFFF |

HAPTIC SCENE REPRESENTATION FORMAT

CROSS REFERENCE TO RELATED APPLICATIONS

This application is a U.S. National Stage Application under 35 U.S.C. § 371 of International Patent Application No. PCT/EP2021/074515, filed 6 Sep. 2021, which is incorporated herein by reference.

This application claims priority to European Application No. 20306028.0, filed 14 Sep. 2020, which is incorporated herein by reference in its entirety.

TECHNICAL FIELD

At least one of the present embodiments generally relates to haptics and more particularly to the definition of a haptic scene representation format.

BACKGROUND

Fully immersive user experiences are proposed to users through virtual reality (VR) systems based on immersion and interactions. Current visual and auditory feedback provide satisfying levels of realistic immersion. The interaction requires controls and feedback. There exist many different ways of control that fulfill the need of the users. Feedback can be provided by haptics that allow a human user to perceive a virtual environment with his senses. However, haptics is still one area of potential progress to improve the overall user experience in a virtual reality system.

Conventionally, a VR system is based on a 3D scene representing a virtual environment and comprising virtual objects localized within the 3D scene. These objects may be static or dynamic. To improve the user interaction with the elements of the virtual environment, haptics feedback may be used. Therefore, haptics signals describing the haptic feedback to be generated are preferably associated to elements of the virtual environment. Haptic signals are obtained by the haptic rendering device based on interactions of the user within the virtual environment and are then rendered by the haptic rendering device. Although illustrated in the context of a VR system, the principles described herein apply also to other contexts using haptics such as augmented reality or haptics-enhanced video rendering for example and more generally apply to any haptics-based user experience.

Haptics refers to sense of touch and includes two types, tactile and kinesthetic. The first relates to tactile sensations such as friction, roughness, hardness, temperature and is felt through the mechanoreceptors of the skin (Merkel cell, Ruffini ending, Meissner corpuscle, Pacinian corpuscle). The second is linked to the sensation of force/torque, position, motion/velocity provided by the muscles, tendons and the mechanoreceptors in the joints. The signals corresponding to these modalities are comparable to audio signals (i.e. monodimensional) with a lower frequency range, corresponding to vibrational signals. The frequency range is about 0-1 KHz depending on the type of modality. Most existing devices able to render haptic signals are capable of generating vibrations. Examples of such devices, i.e. haptic actuators, are linear resonant actuator (LRA), eccentric rotating mass (ERM), voice-coil linear motor. These actuators may be integrated into haptic rendering devices such as haptic suits but also smartphones or game controllers.

To encode haptic signals, several formats have been defined related to either a high level description using XML-like formats (for example MPEG-V), parametric representation using json-like formats (Apple AHAP, immersion.com HAPT), or waveform encoding (IEEE 1918.1.1 ongoing standardization for tactile and kinesthetic signals). The HAPT format has been recently included into the MPEG ISOBMFF file format specification (ISO/IEC 14496 part 12).

Embodiments described hereafter have been designed with the foregoing in mind.

SUMMARY

A haptic rendering device and corresponding method allow to render an haptic effect described by metadata comprising, for at least one haptic channel, an information representative of a geometric model, and an information representative of an element of the geometric model where to apply the haptic feedback, and an information representative of the haptic signal to be applied. In at least one embodiment, the haptic signal is carried over a separate file using an audio file format able comprising multiple channels. A file format for carrying the required metadata information is provided.

A first aspect of at least one embodiment is directed to a signal for rendering a haptic feedback carrying information representative of the haptic feedback comprising a metadata file comprising at least one information representative of a haptic channel comprising an information representative of a geometric model, and an information representative of an element of the geometric model where to apply the haptic feedback, and a haptic file comprising at least one haptic signal to be rendered.

A second aspect of at least one embodiment is directed to an apparatus for rendering a haptic signal comprising a processor configured to obtain information representative of the haptic feedback according to first aspect, select, based on the information representative of the haptic feedback, a haptic signal and a set of haptic actuators of the haptic rendering device, and render haptic feedback by applying the selected haptic signal to the selected haptic actuator of the haptic rendering device.

A third aspect of at least one embodiment is directed to a method for rendering a haptic signal comprising obtaining information representative of the haptic feedback according to first aspect, selecting, based on the information representative of the haptic feedback, a haptic signal and a set of haptic actuators of the haptic rendering device, and rendering haptic feedback by applying the selected haptic signal to the selected haptic actuator of the haptic rendering device.

According to a fourth aspect of at least one embodiment, a computer program comprising program code instructions executable by a processor is presented, the computer program implementing at least the steps of a method according to the first aspect.

According to a fifth aspect of at least one embodiment, a computer program product which is stored on a non-transitory computer readable medium and comprises program code instructions executable by a processor is presented, the computer program product implementing at least the steps of a method according to the first aspect.

BRIEF DESCRIPTION OF THE DRAWINGS

FIG. 4 illustrates an example syntax for the haptic feedback description file according to at least one embodiment.

FIG. 6 illustrates an example syntax for using a custom geometric model according to at least one embodiment.

FIG. 7 illustrates an example syntax for haptic file according to at least one embodiment.

FIG. 8 illustrates an example of definition of the body parts according to at least one embodiment.

DETAILED DESCRIPTION

In at least one embodiment, a syntax definition for a file format describes information allowing to render haptic effects on a user. For that purpose, according to the embodiments described hereafter, the following terminology is used in this document.

A "haptic object" corresponds to a physical phenomenon to be transmitted to the user. Haptic objects may be related to the global environment, such as a breeze of wind, or to a local effect such as a punch on the chest. Another example of haptic object is an explosion. An explosion can be rendered though vibrations and heat thus requiring different aspects of haptic feedback. This is done using multiple "haptic channels". A "haptic feedback description file" is used to describe required elements to provide the haptic feedback. Such file may gather multiple haptic objects themselves carrying multiple channels. Typically, one haptic object may be related to a global effect (wind), and one haptic object may be related to a local effect (explosion) and by rendering using vibrations and heat through two haptic channels.

The haptic effect is most efficient when applied at a precise location. Therefore, it is proposed, in at least one embodiment, for each haptic feedback channel, to specify where the effect should be applied. This may be done in two steps. Firstly by selecting a geometric model representing the spatial acuity of the haptic perception and secondly by selecting the location where the haptic effect should be applied. The geometric model may be selected either as a generic model chosen from a set of standard predetermined models. In this case, the model is based on a mesh of a human body. The geometric model may also be determined as a custom geometric model by specifying its geometry. This allows to adapt to non-standard haptic rendering devices, such as a haptic chair for example. In this case, the spatial acuity of the haptic perception is limited by the precise location of the actuators on the rendering device. In the proposed file format, the geometric model is referred to as being the "avatar model" and is identified by an "avatar_ID". In addition, a "type" of haptic effect is associated with an avatar_ID. In the example of the explosion, two haptic channels are used, a first one for transmitting the vibration and a second one for transmitting the heat. These haptic channels are associated with corresponding avatar_IDs, one that is adapted for the vibration and one adapted for the heat. Furthermore, audio signals describing the haptic effect to be applied are associated to each of the haptic channels. These haptic signals are stored as separate audio channels in an audio file.

Figure 1:
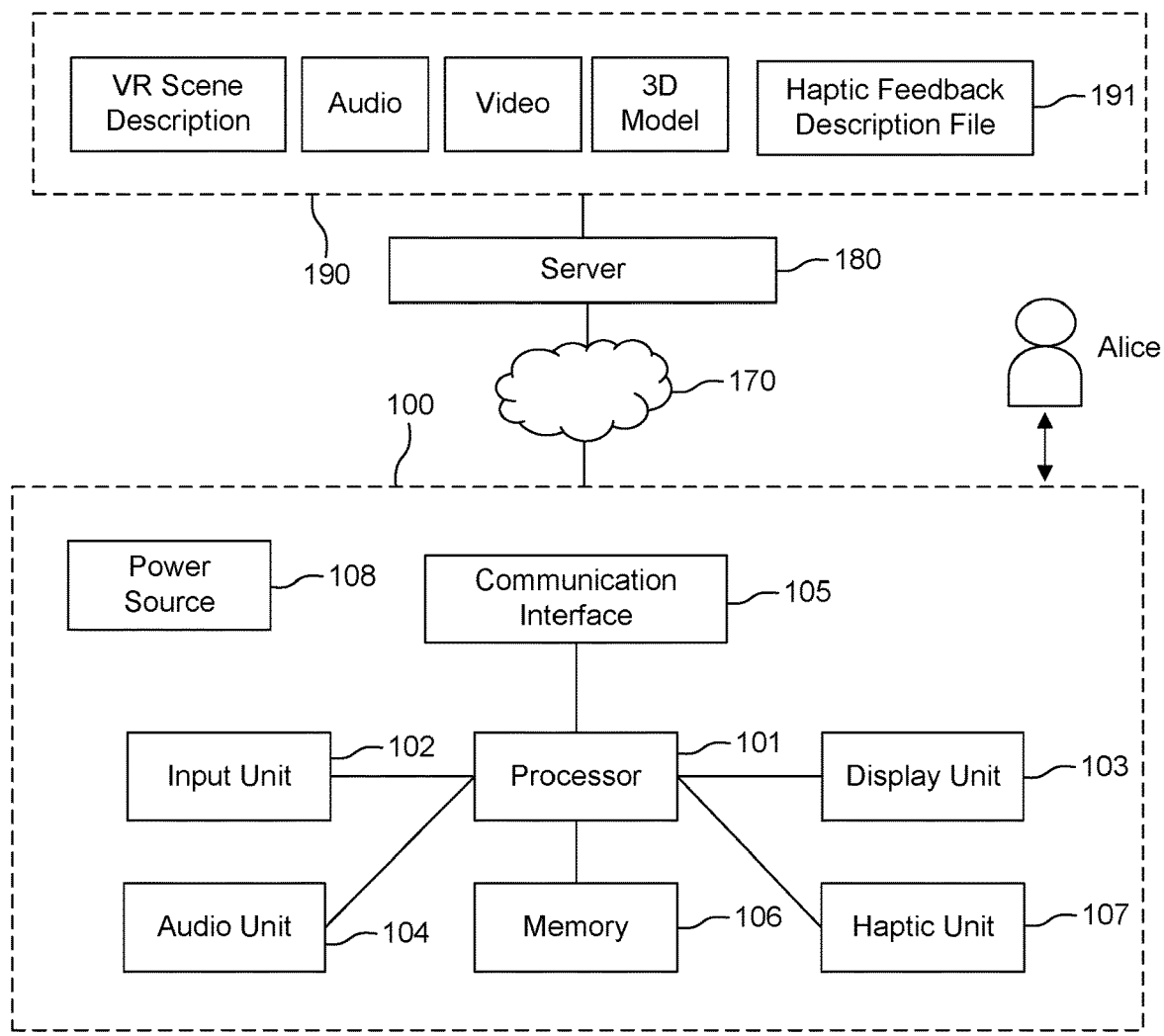
FIG. 1 illustrates a block diagram of an example of system in which various aspects and embodiments are implemented.

FIG. 1 illustrates a block diagram of an example of system in which various aspects and embodiments are implemented. In the depicted virtual reality system, the user Alice uses the haptic rendering device 100 to interact with a server 180 hosting a virtual reality scene 190 through a communication network 170. This virtual reality scene 190 may comprise various files representing different types of contents such as audio, video, 3D models, VR scene description and at least one haptic feedback description file 191.

The haptic rendering device comprises a processor 101. The processor 101 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor may perform data processing such as haptic signal decoding, input/output processing, and/or any other functionality that enables the device to operate in a virtual reality system.

The processor 101 may be coupled to an input unit 102 configured to convey user interactions. Multiple types of inputs and modalities can be used for that purpose. A physical keypad and a touch sensitive surface are typical examples of input units adapted to this usage although voice control could also be used. In addition, the input unit may also comprise a digital camera able to capture still picture or video. The processor 101 may be coupled to a display unit 103 configured to output visual data to be displayed on a screen. Multiple types of displays can be used for that purpose such as a liquid crystal display (LCD) or organic light-emitting diode (OLED) display unit. The processor 101 may also be coupled to an audio unit 104 configured to render sound data to be converted into audio waves through an adapted transducer such as a loudspeaker for example. The processor 101 may be coupled to a communication interface 105 configured to exchange data with external devices. The communication preferably uses a wireless communication standard to provide mobility of the haptic rendering device, such as LTE communications, Wi-Fi communications, and the like. The processor 101 may access information from, and store data in, the memory 106, that may comprise multiple types of memory including random access memory (RAM), read-only memory (ROM), a hard disk, a subscriber identity module (SIM) card, a memory stick, a secure digital (SD) memory card, any other type of memory storage device. In embodiments, the processor 101 may access information from, and store data in, memory that is not physically located on the device, such as on a server, a home computer, or another device.

The processor 101 may be coupled to a haptic unit 107 configured to provide haptic feedback to the user, the haptic feedback being described by a haptic feedback description file 191 associated with the virtual reality scene 190. The haptic feedback description file 191 describes the kind of feedback to be provided according to the syntax described further below. Such description file is typically conveyed from the server 180 to the haptic rendering device 100. The haptic unit 107 may comprise a plurality of haptic actuators located at a plurality of positions on the haptic rendering device. Different haptic units may have a different number of actuators and/or the actuators may be positioned differently on the haptic rendering device.

The processor 101 may receive power from the power source 108 and may be configured to distribute and/or control the power to the other components in the device 100. The power source may be any suitable device for powering the device. As examples, the power source may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

While the figure depicts the processor 101 and the other elements 102 to 108 as separate components, it will be appreciated that these elements may be integrated together in an electronic package or chip. It will be appreciated that the haptic rendering device 100 may include any sub-combination of the elements described herein while remaining consistent with an embodiment. The processor 101 may further be coupled to other peripherals or units not depicted in FIG. 1 which may include one or more software and/or hardware modules that provide additional features, functionality and/or wired or wireless connectivity. For example, the peripherals may include sensors such as a universal serial bus (USB) port, a vibration device, a television transceiver, a hands free headset, a Bluetooth® module, a frequency modulated (FM) radio unit, a digital music player, a media player, a video game player module, an Internet browser, and the like. For example, the processor 101 may be coupled to a localization unit configured to localize the haptic rendering device within its environment. The localization unit may integrate a GPS chipset providing longitude and latitude position regarding the current location of the haptic rendering device but also other motion sensors such as an accelerometer and/or an e-compass that provide localization services.

Typical examples of haptic rendering device 100 are haptic suits, smartphones, game controllers, haptic gloves, haptic chairs, haptic props, motion platforms, etc. However, any device or composition of devices that provides similar functionalities can be used as haptic rendering device 100 while still conforming with the principles of the disclosure.

In at least one embodiment, the device does not include a display unit but includes a haptic unit. In such embodiment, the device does not render the scene visually but only renders haptic effects. However, the device may prepare data for display and provide the data to a display device, such as a screen, so that this device can perform the display. Example of such devices are haptic suits or motion platforms.

In at least one embodiment, the device does not include a haptic unit but includes a display unit. In such embodiment, the device does not render the haptic effect but only renders the scene visually. However, the device may prepare data for rendering the haptic effect and provide the data to a haptic rendering device, such as a haptic prop, so that this device can perform the haptic rendering. Examples of such devices are smartphones, head-mounted display or laptops.

In at least one embodiment, the device does not include a display unit nor does it includes a haptic unit. In such embodiment, the device does not visually render the scene and does not render the haptic effects but prepares data for display and provide the data to a display device, such as a screen, so that this device can perform the display and also prepares data for rendering the haptic effect and provide the data to a haptic rendering device, such as a haptic prop, so that this device can perform the haptic rendering. Examples of such devices are desktop computers, optical media players, or set-top boxes.

In at least one embodiment, the virtual reality scene and associated haptic feedback description file are directly hosted in memory 106 of the haptic rendering device 100 allowing for local interactions.

Figure 2:
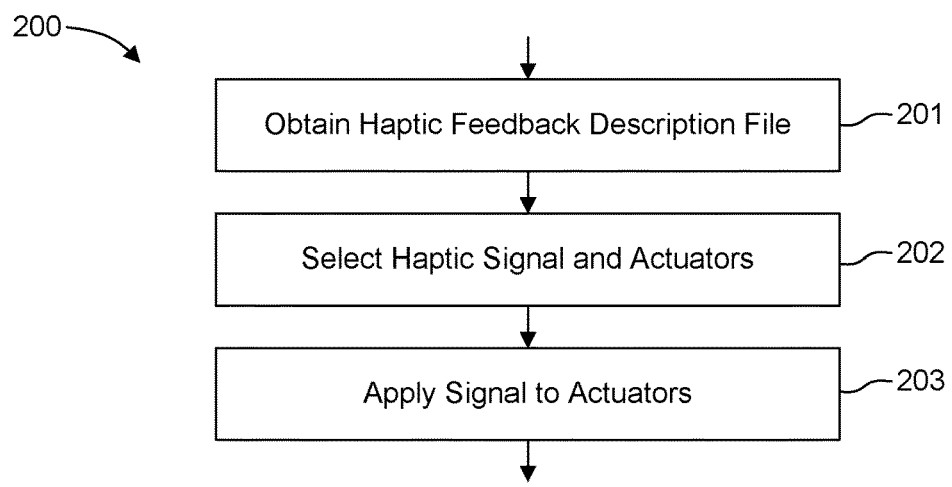
FIG. 2 illustrates an example flowchart of a process for rendering a haptic feedback description file according to at least one embodiment.

FIG. 2 illustrates an example flowchart of process for rendering a haptic feedback description file according to at least one embodiment. Such process 200 is typically implemented in a haptic rendering device 100 and executed by a processor 101 of such device. In step 201, the processor obtains a haptic feedback description file (191 in FIG. 1). This may be done for example by receiving it from a server through a communication network, by reading it from an external storage device or a local memory, or by any other means. In step 202, the processor analyses the haptic feedback description file in order to determine how to apply the haptic effect of the haptic rendering device, in other words, to select which haptic signal needs to be applied on which actuator or set of actuators. In step 203, the processor provides the selected haptic signal to the haptic unit that applies on the haptic actuator or set of actuators and thus render the haptic feedback.

In at least one embodiment, it is proposed to deliver the haptic feedback using a combination of files, where a haptic feedback description file comprises metadata that describe different parameters of the haptic feedback and where a haptic file conveys the haptic signal to be rendered, typically under the form of an audio signal. In at least one embodiment, the metadata is stored in a separate file inspired from the MPEG object audio metadata ".oam" file format (and the haptic file is a separate file using the ".way" file format, also known as waveform audio file format. In other embodiments, other file formats are used while respecting the principles disclosed herein.

Figure 3:
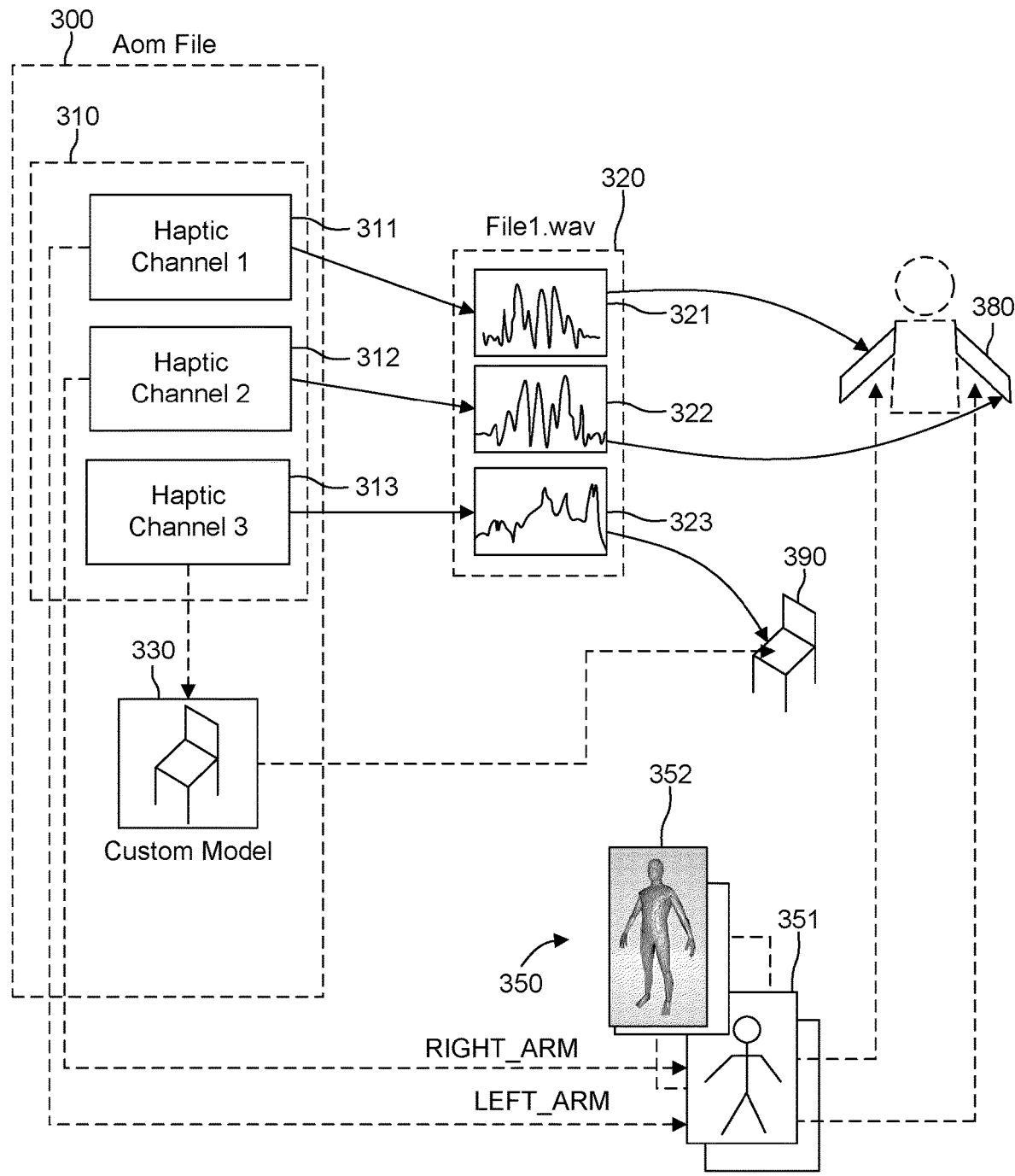
FIG. 3 illustrates an example of data organization of a haptic feedback description file according to at least one embodiment.

FIG. 3 illustrates an example of data organization of a haptic feedback description file according to at least one embodiment. In this example, a first haptic rendering device is a haptic vest 380 where only the two sleeves comprise haptic actuators to render vibrations. A second haptic rendering device is a haptic chair 390, also able to render vibrations.

First, the haptic effect to be rendered is described in a haptic feedback description file 300. According to at least one embodiment, this file uses the aom file format and syntax. In this example, one haptic object 310 is present in the haptic feedback description file 300. However, as introduced above, a haptic feedback description file may comprise multiple haptic objects.

The haptic object 310 comprises three haptic channels 311, 312, 313. The haptic channel 311 is associated with a geometric model 351 (avatar_ID) selected from the set of standard generic predefined geometric models 350 and more precisely to the left arm of the geometric model 351 (body_part_mask corresponding to left arm). The haptic channel 310 is also associated with the audio file 311 and more particularly with the first channel of the audio file comprising the audio signal 321. Thus, the haptic rendering device 380 is then able to select the audio signal 321 to be applied to the haptic actuators of the left arm. Similarly, for the right arm, as defined by the information of the second haptic channel 312, the audio signal 322 (second channel of the audio file) will be applied to the haptic actuators of the right arm, allowing the render on the haptic vest 380 the vibration as defined in the haptic feedback description file 300.

The same principle applies to the haptic chair 390 with the difference that it uses a custom avatar_ID. Indeed, its geometry is not part of the set of generic geometric models. Therefore, the corresponding geometry is defined as a custom avatar_ID 330 within the haptic feedback description file 300. The third audio signal 323 is selected to be applied to the actuators of the haptic chair 390.

The association between the haptic channels and the audio channels is implicit and is done according the order of appearance. The first haptic channel of a haptic object will be associated with the first audio channel of the audio file (explicitly) associated with the haptic object.

In a second example (not illustrated) of data organization for a haptic feedback description file according to at least one embodiment, the file comprises two different haptic objects. Therefore, the haptic channels are in different haptic objects. In this case, it is possible to use two different audio files file1.wav and file2.wav.

The set of models 350 typically represent the geometry of human bodies with different levels of details and thus provide different levels of precision. In the figure, the precision of geometric model 351 is much lower than the detailed mesh of geometric model 352.

FIG. 4 illustrates an example syntax for the haptic feedback description file according to at least one embodiment. In this embodiment, the haptic feedback description file is inspired by the ".aom" object metadata file format. In another embodiment, xml format is used and the syntax described in FIG. 4 is adapted to this format. Any other description format (for example json, CSV, binary, etc.) may be adapted to convey such information. The haptic feedback description file comprises metadata describing the haptic feedback to be applied. It supports multiple haptic objects and haptic channels. In particular, it maps the haptic channels onto parts of a user body mesh. This allows spatialization of the haptic effects and provides independence from the rendering device. Each channel is mapped to a body part. The mapping may be specified with a binary mask, allowing for a rough definition covering a large area where the haptic effect takes places. Alternatively, the mapping may also be specified directly by a set of vertices identified by an identificator, allowing a much more precise placement of the haptic effect.

The syntax elements for a metadata file inspired by the ".aom" object metadata file format can be the following:
  format_id_string: unique character identifier to identify the format, equal to "OAM",
  format_version: version number of the file format, for example equal to 1,
  number_of_haptic_objects: number of haptic objects compiling the scene. An object typically corresponds to an end-user haptic rendering device,
  number_of_avatars_models: number of avatar descriptions, corresponding to one or several models,
  description_string: description string containing a human readable content description. If shorter than 32 bytes, it is followed by padding null characters. If the string is 32 bytes long, the string is terminated without a null character.
  avatar_description( ) model to describe the avatar body representation of the user or more generally the geometry on which the haptic actuators are based. This model is further described below, in relation with FIGS. 6 and 8,
  haptic_object_file_name: description string containing the file name of the corresponding haptic object file. If shorter than 64 bytes, it is followed by padding null characters. If the string is 64 bytes long, the string is terminated without a null character. An haptic object file might include more than one channel,
  number_of_haptic_channels: number of simultaneous channels for each haptic object,
  avatar_ID: identifier for the geometric model (one may have one mesh resolution per type of haptic signal),
  body_part_mask: binary mask specifying body parts on which to apply the effect,
  number_of_vertices: number of additional vertices on the geometric model affected by the haptic effect,
  vertex_ID: links to the identifier of the vertex in the avatar model,
  coefficient: gain applied to the specific vertex Please note that the format_id_string may use other character identifiers such as "OHM" that could stand for object haptic metadata for example.

The coefficient may be used to scale the application of the haptic effect. In the example of an explosion that should generate vibrations on a full haptic suit, supposing the front of the body is facing the explosion, the haptic effect may be amplified at the front of the suit by applying a coefficient greater than 1.0 and may be reduced at the back of the suit by applying a coefficient smaller than 1.0, still using the same haptic audio signal but with different amplitudes.

In at least one embodiment, the description_string is not at the top level but is located in the channel loop, allowing a lower-level precise description at the cost of a potential increased size.

Generally, the geometric model corresponds to a model of a human body but in some specific cases, the topology of the rendering device may be different from a human body model, as illustrated in FIG. 3 with the example of a haptic chair. Two methods are proposed to specify this geometric model: a first method using generic geometric models and a second method using a custom geometric model.

For the generic models, a range of avatar_IDs is reserved, for example from 0 to 255. These generic models have a known topology and body segmentation (i.e. known vertex positions, vertex IDs, faces and body parts). A generic geometric model also has fixed level of details and type of haptic effect.

When a custom geometric model is needed, an avatar_ID value outside of the reserved range of values must be used. In this case, the geometric model also needs to be provided. Such model is generally directly representing the location of the haptic actuators onto the rendering device (see the example of the haptic chair above).

Figure 5A:
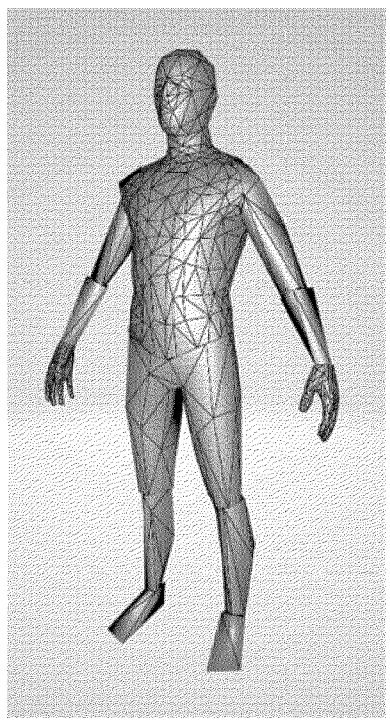
FIGS. 5A, 5B, 5C illustrate three generic geometric models with various mesh density.
Figure 5B:
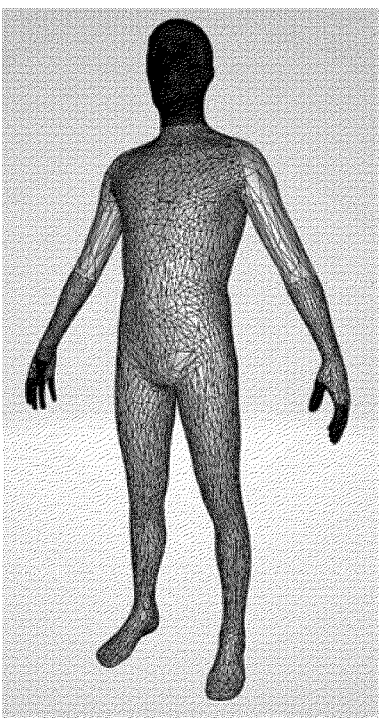
Figure 5C:
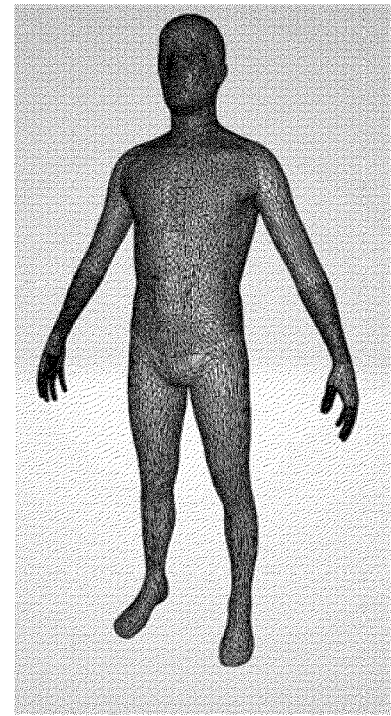

FIGS. 5A, 5B, 5C illustrate three examples of generic geometric models with various mesh density for example adapted to rendering of temperature, vibration or pressure. The topology of each of these models present different levels of details that correlate to the sensitivity to various haptic effects. For instance, tactile effects require higher mesh density than kinesthetic effects. On the other end, effects such as wind or global temperature variations can be applied on a very coarse geometric model.

Using standard generic models allows to reduce the amount of necessary data to convey. However, it may require further calibration in order to learn the mapping between each vertex of the mesh and the different actuators of the haptic device. Such calibration is typically done directly by the manufacturer before delivering the device. However, in some cases, a calibration could be performed automatically through geometry processing methods or manually by the user, for example to take into account a user's haptic preferences.

FIG. 6 illustrates an example syntax for using a custom geometric model according to at least one embodiment. Depending on the application, for each content, a custom geometric model can be used. This model may be adapted to the user, for example taking into account its own specificities. In at least one embodiment, the model is specified using the format presented in FIG. 6 that provides the set of vertices, the set of faces and the associated body parts of the mesh.

The syntax elements for a custom geometric model are the following:

format_version: version number of the file format, for example equal to 1.
avatar_ID: identifier for the avatar description (one may have one mesh resolution per type of haptic signal).
lod: number specifying the level of details of the avatar: for example 0, 1, or 2 for respectively low, average and high definition. It allows to use more or less complex representations.
type: type of haptic effect associated with the model. Typically, vibration, pressure, temperature or other. A different type can be associated with a different lod resolution.
number_of_vertices: number of vertices of the mesh.
number_of_faces: number of faces in the mesh.
vertex_ID: the index of the corresponding vertex with its spatial localization (x, y, z) with vertex_x, vertex_y, vertex_z.
face_ID: the index of the corresponding face in the mesh.
vertex_ID_1, vertex_ID_2 and vertex_ID_3: the three connected faces to the current vertex vertex_ID
body_part_ID: index of the body part associated with the corresponding vertex.

The embodiment illustrated above uses a triangular mesh. In at least one embodiment, the custom geometric model uses another type of polygon mesh, for example using quadrilaterals.

In at least one embodiment, the polygon mesh is defined in an external geometry definition file (such as an OBJ file for example or any other existing format to define a mesh). In this case, the correspondence between the vertices of the external file and the vertex_ID may be done as following: the first vertex of the external file has a vertex_ID equal to 0 and the vertex_ID is incremented for each vertex of the external file.

In one embodiment, the type syntax element is replaced by an unsigned integer value chosen amongst fixed values for the different types of haptic feedback. For example "1" for vibration, '2' for pressure, and '3' for temperature.

FIG. 7 illustrates an example syntax for haptic file according to at least one embodiment. In this embodiment, the haptic file is based on the ".wav" audio waveform file format. In another embodiment, the '.flac' format is used and the syntax described in FIG. 5 is adapted to this format. Other embodiments use other file formats are used similarly, for example '.ogg', 'aac', '.ac3'.

The syntax elements for a haptic file based on the ".wav" audio waveform file format are the following:

file_type_bloc_ID: constant «RIFF»(0x52, 0x49, 0x46, 0x46)
file_size: file size minus 8 bytes
file_format_ID: constant «WAVE» (0x57, 0x41, 0x56, 0x45)
format_bloc_ID: constant «fmt␣»(0x66, 0x6D, 0x74, 0x20)
bloc_size: number of bytes per bloc-16 (0x10)
audio_format: storage format in the file, equal to 1 to indicate PCM
number_channels: number of channels
frequency: sampling frequency of the data (in hertz)
bytes_per_seconds: number of bytes to read per seconds (i.e., frequency*bytes_per_bloc)
bytes_per_bloc: number of bytes per bloc of samples (i.e., for all channels: number_channels*bits_per_sample/8)
bits_per_samples: number of bits used to code each sample (8, 16, 24)
data_bloc_id: constant «data» (0x64, 0x61, 0x74, 0x61)
data_size: number of data bytes
data_bytes: bytes of the current sample of the current channel The ".way" format is generally intended for audio signals, thus some parameters are specified for those signals. Therefore, some of the parameters have been set specifically to support haptic signals. The coding format is set to 1 indicating PCM encoding so that no compression is applied. The sampling frequency is to be set between 0 and 2 KHz for haptic signals. The number of channels may be up to 65535. This is compatible with the way header. The number of bits/samples is set to 24 to get the highest resolution.

Figures 9, 10:
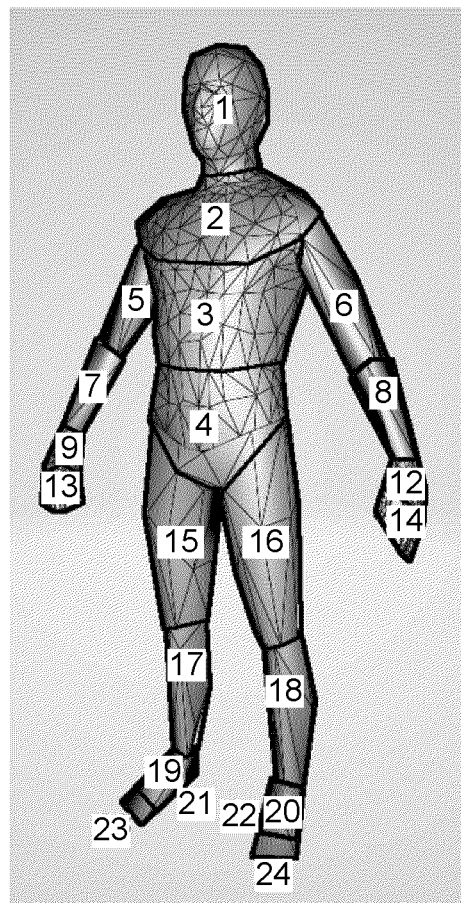
FIG. 9 illustrates an example of mapping of the body parts on the custom geometric model of FIG. 9.
FIG. 10 illustrates examples of combinations of body parts using a binary mask according to at least one embodiment.

FIG. 8 illustrates an example of definition of the body parts according to at least one embodiment. In the table of this figure, the first column identifies a body_part_ID, the second column describes the name of the body part, the third column defines the binary mask value for the body part and the fourth column shows the equivalent hexadecimal value of the mask. A body part ID is assigned to each face of a geometric model (for example last line of FIG. 7). Therefore, the faces of a common body part are grouped together, in order to be selected efficiently. FIG. 9 illustrates an example of mapping of the body parts on the generic geometric model of FIG. 5A. It shows the body_part_ID (first column of FIG. 8) overlaid on the different body parts of the model (1 for the head, 2 for the chest, etc.).

FIG. 10 illustrates examples of combinations of body parts using a binary mask according to at least one embodiment. The first column of the table corresponds to the name of the body part, the second column defines the binary mask value for the body part and the third column shows the equivalent hexadecimal value of the mask.

Figure 11A:
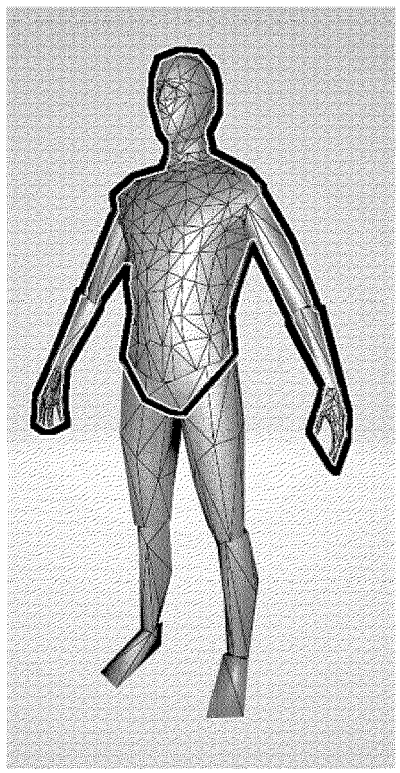
FIGS. 11A, 11B, 11C respectively illustrate groupings of body parts for the upper body, the left leg and the right arm.
Figure 11B:
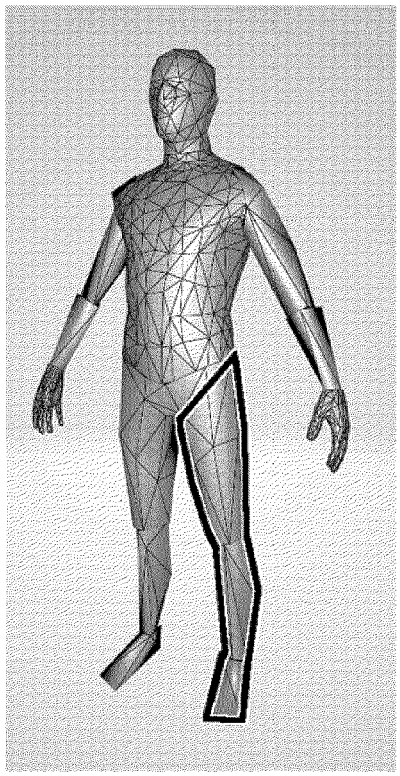
Figure 11C:
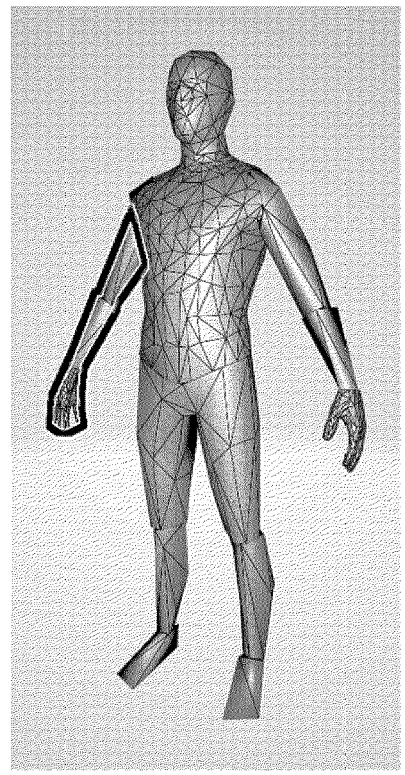

As seen above, each body part is associated with a binary mask (third column of FIG. 10). This provides a convenient way to combine multiple body parts. For example, the upper body corresponds to grouping the body parts with IDs 1 to 14. This combination is performed by a bitwise OR operation over the masks of the different body parts to get the corresponding mask value. Therefore, a binary mask of 00000000001111111111111 (0x003FFF in hex value) allows to easily group the body parts withs IDs 1 to 14 and thus represents the complete upper body in a very efficient manner. This grouping is shown in FIG. 11A, while FIG. 11B shows the grouping for the left leg (mask=0xAA8000) and FIG. 11C shows the grouping for the right arm (mask value 0x001550).

The embodiments described herein provide a solution to specify haptic effects using a haptic effect description file allowing to encode haptic waveform signals, to provide a unified file format description and container for various haptic signals, to support multi-channel capabilities and coding, compatible with existing signal-based workflows (aka audio ones), compatible with many haptic rendering devices (single actuators, gamepads, mobile phones, complex multi-actuators devices such as vest or belt), that describes where on the user the effect should be applied, adaptable to the user physiology and tactile perception, potentially personalized per user, independent of the end user rendering device (it is up to this device to adapt the effect to its capabilities and position).

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "obtaining" various pieces of information. Obtaining is, as with "accessing", intended to be a broad term. Obtaining the information may include one or more of, for example, receiving the information, accessing the information, or retrieving the information (for example, from memory or optical media storage). Further, "obtaining" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items as listed.

The invention claimed is:

1. A method for rendering a haptic feedback, the method comprising:
   obtaining data representative of the haptic feedback comprising a metadata file comprising data representative of a haptic channel comprising information representative of a geometric model, the geometric model representing a spatial haptic perception, data representative of an element of the geometric model comprising a location of the geometric model where to apply the haptic feedback, and haptic data comprising at least one haptic signal to be rendered;
   selecting, based on the data representative of the haptic feedback, a haptic signal and at least one haptic actuator of a haptic rendering device; and
   providing the selected haptic signal to the at least one haptic actuator of the haptic rendering device;
   wherein the data representative of a geometric model and the data representative of the location of the geometric model where to apply the haptic feedback are carried within a haptic channel carried by the data representative of the haptic feedback.

2. The method of claim 1, wherein the haptic data is a haptic coding file or audio coding file or other type of waveform coding file.

3. The method of claim 1, wherein the haptic data is a waveform audio file, channels of the waveform audio file are associated with haptic channels and represent the haptic signal to be rendered.

4. The method of claim 1, wherein the geometric model is selected among a set of generic models.

5. The method of claim 1, wherein the data representative of a location of the geometric model where to apply the haptic feedback is a binary mask identifying corresponding elements of the geometric model.

6. The method of claim 1, wherein the data representative of a location of the geometric model where to apply the haptic feedback is a list of vertices of the geometric model.

7. The method of claim 1, wherein the geometric model is identified by an identifier, and wherein a range of identifiers are reserved for generic geometric models.

8. The method of claim 1, wherein the geometric model represents elements of the haptic rendering device comprising haptic actuators.

9. The method of claim 1, wherein the data representative of the haptic feedback further comprises a description of a mesh of a non-generic geometric model, wherein the mesh comprises a set of vertices and a set of faces, and wherein a face of the set of faces is determined by a subset of vertices.

10. The method of claim 1, further comprising, for each vertex of the geometric model, a coefficient for scaling the haptic signal on the vertex.

11. An apparatus for rendering a haptic feedback, the apparatus comprising a processor configured to:
   obtain data representative of the haptic feedback comprising a metadata file comprising data representative of a haptic channel comprising information representative of a geometric model, the geometric model representing a spatial haptic perception, data representative of an element of the geometric model comprising a location of the geometric model where to apply the haptic feedback, and haptic data comprising at least one haptic signal to be rendered;
   select, based on the data representative of the haptic feedback, a haptic signal and at least one haptic actuator of a haptic rendering device; and
   provide the selected haptic signal to the at least one haptic actuator of the haptic rendering device;
   wherein the data representative of a geometric model and the data representative of the location of the geometric model where to apply the haptic feedback are carried within a haptic channel carried by the data representative of the haptic feedback.

12. The apparatus of claim 11, wherein the haptic data is a haptic coding file or audio coding file or other type of waveform coding file.

13. The apparatus of claim 11, wherein the haptic data is a waveform audio file, channels of the waveform audio file are associated with haptic channels and represent the haptic signal to be rendered.

14. The apparatus of claim 11, wherein the geometric model is selected among a set of generic models.

15. The apparatus of claim 11, wherein the data representative of a location of the geometric model where to apply the haptic feedback is a binary mask identifying corresponding elements of the geometric model.

16. The apparatus of claim 11, wherein the data representative of a location of the geometric model where to apply the haptic feedback is a list of vertices of the geometric model.

17. The apparatus of claim 11, wherein the geometric model is identified by an identifier, and wherein a range of identifiers are reserved for generic geometric models.

18. The apparatus of claim 11, wherein the data representative of the haptic feedback further comprises a description of a mesh of a non-generic geometric model, wherein the mesh comprises a set of vertices and a set of faces, and wherein a face of the set of faces is determined by a subset of vertices.

19. A non-transitory computer-readable medium comprising having stored instructions that, when executed by a processor, cause the processor to:

obtain data representative of the haptic feedback comprising a metadata file comprising data representative of a haptic channel comprising information representative of a geometric model, the geometric model representing a spatial haptic perception, data representative of an element of the geometric model comprising a location of the geometric model where to apply the haptic feedback, and haptic data comprising at least one haptic signal to be rendered;

select, based on the data representative of the haptic feedback, a haptic signal and at least one haptic actuator of a haptic rendering device; and provide the selected haptic signal to the at least one haptic actuator of the haptic rendering device;

wherein the data representative of a geometric model and the data representative of the location of the geometric model where to apply the haptic feedback are carried within a haptic channel carried by the data representative of the haptic feedback.

* * * * *